(12) United States Patent
Such et al.

(10) Patent No.: US 6,661,012 B2
(45) Date of Patent: Dec. 9, 2003

(54) X-RAY DETECTOR

(75) Inventors: Olaf Such, Aachen (DE); Francisco Morales Serrano, Aachen (DE); Stefan Schneider, Aachen (DE); Herfried Karl Wieczorek, Aachen (DE); Josef Lauter, Geilenkirchen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 47 days.

(21) Appl. No.: 09/726,782

(22) Filed: Nov. 30, 2000

(65) Prior Publication Data

US 2001/0002699 A1 Jun. 7, 2001

(30) Foreign Application Priority Data

Nov. 30, 1999 (DE) .......................................... 199 57 429
May 26, 2000 (DE) .......................................... 100 26 160

(51) Int. Cl.[7] .............................................. G01T 1/202
(52) U.S. Cl. ...................................................... 250/367
(58) Field of Search ............................. 250/363.1, 367, 250/368

(56) References Cited

U.S. PATENT DOCUMENTS

| 4,321,473 A | * | 3/1982 | Albert .......................... 378/148 |
| 4,837,792 A | * | 6/1989 | Goethert .......................... 378/4 |
| 4,995,107 A | * | 2/1991 | Klingenbeck .................. 378/7 |
| 5,648,997 A | * | 7/1997 | Chao .......................... 378/98.4 |
| 5,808,306 A | * | 9/1998 | Skillicorn et al. ........... 250/367 |
| 6,304,626 B1 | * | 10/2001 | Adachi et al. ................. 378/19 |

FOREIGN PATENT DOCUMENTS

| WO | WO9858389 | 12/1998 |
| WO | WO 0060520 | 10/2000 |

* cited by examiner

Primary Examiner—David Porta
Assistant Examiner—Shun Lee
(74) Attorney, Agent, or Firm—John Vodopia

(57) ABSTRACT

An X-ray detector that includes a sensor matrix and a scintillator arrangement and in which wire elements are spaced apart in layers A and B in order to reduce the crosstalk in neighboring detector elements. Scintillators are inserted at least partly in the grid openings formed.

17 Claims, 2 Drawing Sheets

X-RAY DETECTOR

BACKGROUND OF THE INVENTION

The invention relates to an X-ray detector which includes a sensor matrix and a scintillator arrangement.

X-ray detectors are employed for converting X-rays into light and/or into detectable charge carriers.

The X-rays emitted by an X-ray source in computed tomography (CT) systems and other imaging X-ray systems penetrate a patient to be examined and is attenuated in conformity with the varying density and chemical composition of the tissue or bone to be examined. The X-rays are converted into light in a scintillating material in the X-ray detector. The X-ray detector is typically composed of an anti-scatter grid, a scintillator arrangement which is situated therebelow and a sensor matrix which is situated therebelow again. The sensor matrix consists of a multitude of light-sensitive sensors, a single sensor also being referred to as a detector element or a channel. Exposure of the X-ray detector to X-rays, causes scattered X-ray photons and scattered radiation in the visible wavelength range, thus giving rise to crosstalk between neighboring detector elements or channels. In order to reduce such crosstalk that falsifies the primary X-ray image to be formed, the X-rays are made to pass through an anti-scatter grid which is focused onto the focus of the X-ray source.

It is thus achieved that the detection of the X-ray photons always concerns only the X-ray photons that are characteristic of the attenuation of the irradiated object.

In order to reduce the crosstalk component of the overall signal even further, the scintillator arrangement, being enclosed by light-reflecting external layers, is additionally segmented by X-ray absorbing shutters which are known as separators, so that scattered radiation (visible radiation or X-rays) that is incident at an angle is absorbed and does not reach the neighboring detector element. For conventional single-line detectors such separators are usually constructed as white epoxy resin layers or shutters of a black metal (Pb, WO, MO) that are coated so as to be reflective ($TiO_2$). For X-ray detectors with integrated electronic circuitry the metal inserts offer a further advantage, that is, protection of the underlying semiconductor structures against X-rays.

WO 98/58389 describes an arrangement for the manufacture of large-area two-dimensional grids. A grid is then formed by the stacking of metal layers in which holes are etched. The openings of the resultant grid can be filled with phosphor or another scintillator material. The large-area grids are realized by way of puzzle-like connection of a plurality of sub-grids. The lithographic manufacture of the metal layer enables a high precision to be achieved. The superposed metal layers are fixed by means of pins that are to be inserted into appropriate holes.

Such a grid is manufactured with a great expenditure. The manufacture of each metal layer requires its own mask. Moreover, the insertion of scintillator blocks into grids thus constructed is intricate, because on the one hand the dimensions of the described grid are aimed at achieving a very high resolution while on the other hand the metal layers have steep edges impeding the insertion of metal blocks.

OBJECT OF THE INVENTION

It is an object of the invention to provide an X-ray detector in which the crosstalk of the scattered radiation is reduced in an X-ray detector which is segmented in two directions in space, and can be manufactured with a high precision and in large numbers at an acceptable cost. It is also an object of the invention to provide a scintillator in which the underlying semiconductor structures are protected against X-rays.

The object is achieved in that there are provided a plurality of layers of wire elements that are spaced apart, are arranged so as to receive scintillators at least partly between the wire elements.

To this end, first a grid is formed from layers of wire, while using a kind of weaving technique. The wire is to be selected from metals having a high X-ray absorption, for example molybdenum or tungsten. A plurality of wire elements of corresponding length are arranged in a layer. A layer to be arranged on top thereof is preferably oriented at an angle of 90° relative to the wire elements of the underlying layer. Repeated superposition of such wire element layers yields a grid which is segmented in two directions in space.

In a preferred embodiment of the invention a respective scintillator element is inserted in each of the resultant holes.

Because all holes have the same dimensions, scintillator elements that can be pressed, for example, into these holes can be manufactured in a simple and inexpensive manner. This results in a scintillator arrangement in which the individual detector elements of the underlying sensor matrix are separated from one another by the wire elements.

This type of scintillator arrangement can be realized in many sizes, the scintillator arrangement nevertheless maintaining a high stability. The scintillator arrangement can be adapted to curvatures as they occur, for example in the case of CT arms.

Because of the small height of the scintillator arrangement it is not absolutely necessary to focus the grid thus formed onto the focus of a radiation source.

A combined anti-scatter grid and scintillator arrangement is obtained by manufacturing a grid of correspondingly larger dimensions from wire elements. It is then useful to focus the grid onto the focus of the radiation source. To this end, the distance between the wire elements in the successive layers is varied in conformity with the radiation angle. Thus, the spacing of the wire elements in the upper layers of the grid must be smaller than the spacing of the wire elements in the lower layers of the grid. In this context the terms upper and lower relate to the direction of incidence of the X-rays. This means that the layer which is arranged nearest to the radiation source has the smallest spacing of the wire elements and that the layer situated furthest from the radiation source, or nearest to the sensor matrix, has the largest spacing of the wire elements. The geometrical shape of such a grid opening is that of a cone having a square base.

As described above, scintillator blocks or scintillator elements are inserted into the lower part of the grid thus formed. This results in a combined grid which, in conjunction with the underlying sensor matrix, forms an X-ray detector of flexible dimensions that can be manufactured at low costs. The wire elements can be arranged so as to form a grid according to the invention with great precision.

The wire elements can also advantageously be made of a synthetic material containing substances absorbing X-rays. This woven grid, or the layers with wire elements, can also be manufactured by means of an injection molding process. The wire preferably has a round cross-section of, for example approximately 100 $\mu$m, but any other available cross-section can also be used.

The grid structure dimension of the present embodiment is assumed to be approximately 1.5 mm×1.5 mm. Because of the small height of such a scintillator arrangement focusing is not necessary for the time being, but can also be realized. The grid for the scintillator arrangement, or also a grid combined with an anti-scatter grid, may comprise plane or slightly curved opening sides and hence can be used for or adapted to all known detector techniques. A typical height of such a scintillator arrangement is approximately 4 mm, so that a significantly lower building height is required in comparison with an anti-scatter grid. Scintillator elements cut or pressed so as to be shaped as small cubes are inserted into the grid openings. The dimensions are, for example 1.4 mm×1.4 mm×4 mm. Using these dimensions the precision of the structure is determined by the grid. After the insertion of the scintillator elements, the grid is provided with a white light-reflecting adhesive or lacquer, for example epoxy resin. The majority of the surfaces of the wire elements will thus reflect; the reflection could be less only at the areas of direct abutment of the wires against the scintillator cubes or elements. When the grid structure itself is coated so as to be reflective or when it is made of a white material, this drawback could be compensated.

A scintillator structure which is segmented in two directions in space can thus be efficiently manufactured. The requirements imposed as regards precision of the regularity of the elements could thus far not be satisfied by a cutting process performed for the scintillator segmentation. Even in the case of less severe requirements imposed as regards the individual dimensions of the scintillator elements, embedding in a grid forces the structure into a regular raster whose precision can be readily checked.

It is also possible to absorb radiation incident perpendicularly in the separating layers or separators formed by the wire elements, so that any semiconductor structure present at that area is protected.

It has been found in a further embodiment that the spacing of individual wire elements in a layer can be advantageously varied. X-ray detectors may have a different resolution so that, for example, a coarse resolution may occur in the edge zone of the X-ray detector and hence also in the edge zone of the anti-scatter grid. To this end, the wire elements in the edge zones should be situated at a distance from one another which is larger than the distance in the central zone in which the resolution of the X-ray detector is highest.

The arrangement of a plurality of successive layers with the same orientation of the wire elements offers the advantage that scattered radiation is absorbed for all angles of incidence. In the case of a regularly constructed grid, in which the orientation of the wire elements changes regularly, scattered radiation of a given angle of incidence could traverse the grid through the gaps present between the wire elements of the individual layers. When a given regularity in the orientation of the grid is avoided, accidental passage of scattered radiation of a given angle of incidence is precluded.

In order to ensure that the individual layers can be suitably stacked, the wire elements can be embedded in a synthetic material which is transparent to X-rays in such manner that each layer has plane surfaces. The thickness of the layers, however, should not exceed the diameter or the cross-sectional dimensions of the wire elements. The layers of wire elements can also be immersed in a liquid X-ray transparent auxiliary material without filled layers being formed. The grid is removed from the auxiliary material before this material hardens. The wire elements are thus bonded together. It has been found that a round cross-section of the wire elements is particularly attractive for such bonding of the wire elements, because the area of contact between the wire elements is particularly small so that a suitable bond can be formed. When the wire elements are welded or soldered together, a square or polygonal cross-section may be advantageous, because more material and hence more surface area is then available for bonding.

The high stability and the low tendency to oscillation of the resultant anti-scatter grid are particularly advantageous in an embodiment of the anti-scatter grid according to the invention. The flexibility in adapting the anti-scatter grid to the resolution of the X-ray detector also appears to be a major advantage over other scattered radiation absorbers.

The object is also achieved by means of an X-ray examination apparatus which includes an X-ray detector in which the anti-scatter grid and/or the scintillator arrangement includes layers of wire elements that are spaced apart.

Embodiments of the invention will be described in detail hereinafter with reference to the drawing. Therein:

DESCRIPTION OF THE PREFERRED EMBODIMENTS

Figure 1:
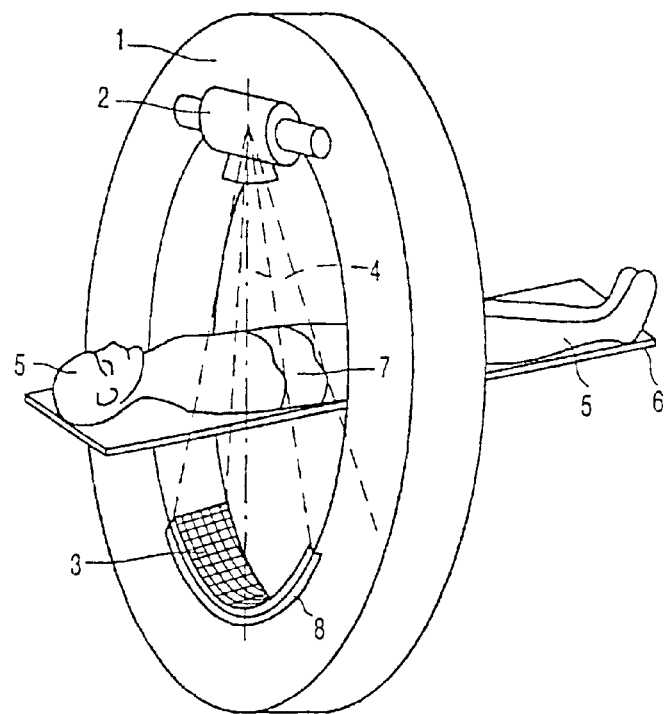
FIG. 1 shows a computed tomography apparatus with a grid overlying the detector.

FIG. 1 shows a computed tomography apparatus with a gantry or a computed tomography arm 1 on which a radiation source 2 is mounted. The X-ray detector 8 and the anti-scatter grid 3 arranged thereabove are arranged so as to face the radiation source 2. A patient 5 is arranged on a table top 6 and is moved into the beam path 4. The computed tomography arm 1 rotates about the patient 5. An examination zone 7 is thus irradiated from all sides. The patient 5 is transported through the rotating computed tomography arm 1 in the horizontal direction or in the direction of the longitudinal axis of the patient, so that a volume image is formed by way of a plurality of cross-sectional images. In the case of two-dimensional X-ray detectors 8, the area scanned during one rotation is substantially larger than that scanned in the case of single-line X-ray detectors. As a result, the transport of the patient 5 through the gantry may be faster.

Figure 2:
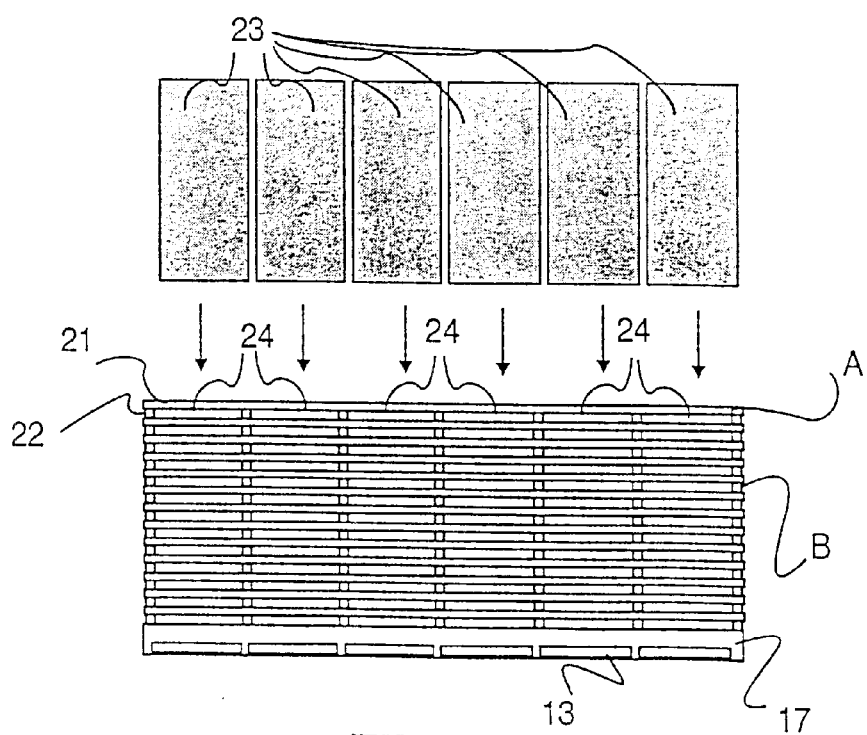
FIG. 2 is a front view of a scintillator arrangement with wire elements.

FIG. 2 shows a scintillator arrangement 20 with an underlying sensor matrix 17. The scintillator arrangement 20 is made of layers of wire elements 21 and 22 that are spaced apart. The wire elements 21 of the upper layer A are oriented in one of the two directions in space. The underlying layer B contains wire elements 22 that are spaced apart and are arranged at an angle of approximately 90° relative to the upper layer. A grid is obtained by multiple stacking of wire element layers thus oriented. Scintillator blocks 23 are inserted into the grid openings 24. The sensor matrix 17 comprises photosensors 13.

Figure 3:
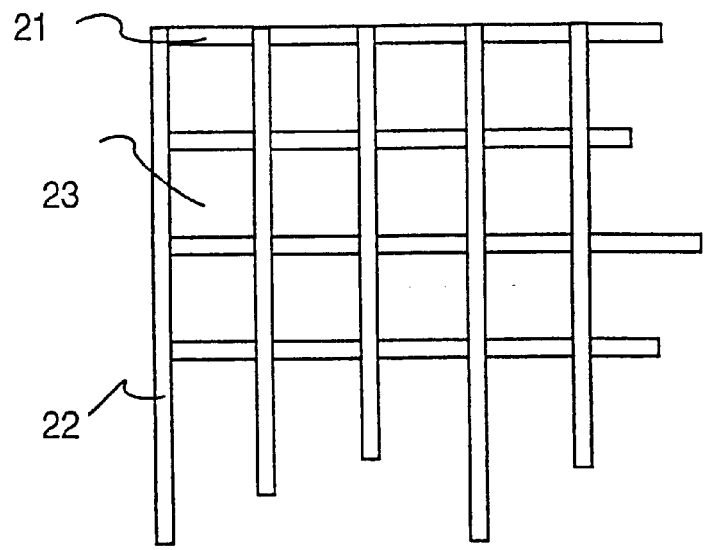
FIG. 3 is a plan view of a grid with scintillators.

FIG. 3 is a plan view of a part of such a grid. This Figure shows a layer of wire elements 21 in the direction in space A and a layer of wire elements 22 in the direction in space B. Scintillator elements 23 are inserted into the grid openings.

Figure 4:
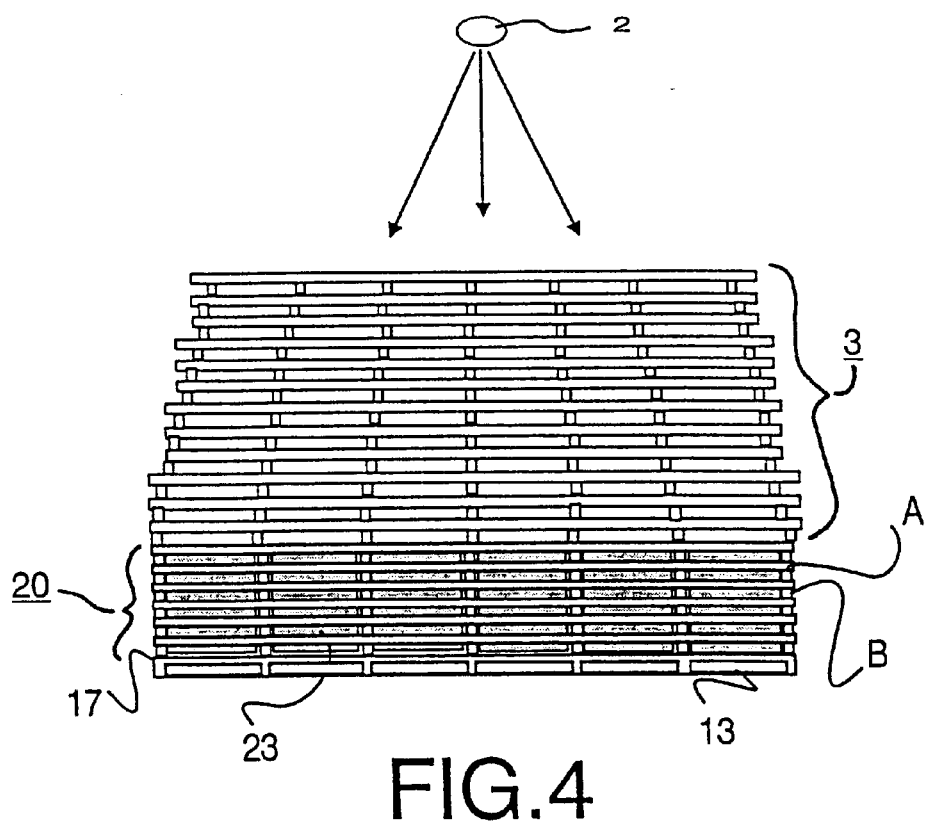
FIG. 4 shows a focused anti-scatter grid with a scintillator arrangement.

FIG. 4 shows a combined grid which consists of a scintillator arrangement 20 and an anti-scatter grid 3. The anti-scatter grid 3 is focused onto the radiation source 2 and the scintillator arrangement 20 is not. The scintillator elements 23 are inserted into the scintillator arrangement 20.

It is alternatively possible to orient successive layers in the same directions in space.

What is claimed is:

1. An X-ray detector which includes a sensor matrix and a scintillator arrangement comprising an anti-scatter grid, wherein the anti-scatter grid consists entirely of a plurality of overlapping layers of wire elements, spaced apart, and arranged to receive scintillators at least partly between the wire elements.

2. The X-ray detector as claimed in claim 1, wherein the layers are arranged at an angle relative to one another, and that the grid thus constructed is arranged to receive one of the scintillators in each resultant opening in the grid formed by the overlapping wires.

3. The X-ray detector as claimed in claim 1, wherein the grid formed by the wire elements is focused onto a focus of an X-ray source.

4. The X-ray detector as claimed in claim 1, wherein the grid formed by the wire elements is adapted to a curvature of a computed tomography arm.

5. The X-ray detector as claimed in claim 1, wherein the wire elements and the scintillators arranged partly therebetween are fixed by means of a substance which is transparent to X-rays.

6. The X-ray detector as claimed in claim 1, wherein the wire elements are reflective for visible light.

7. The X-ray detector as claimed in claim 1, wherein the wire elements of the layers are woven so as to form a wire cloth.

8. The X-ray detector as claimed in claim 1, wherein the wire elements and/or at least parts of the gild formed by the wire elements are formed by injection molding.

9. An X-ray examination apparatus which includes an X-ray detector as claimed in claim 1.

10. A scintillator arrangement which minimizes crosstalk of scattered radiation, consisting of:
   a plurality of layers of wire elements that are spaced apart and interwoven as a grid which is segmented in two directions in space and arranged to receive scintillators at least partly between the wire elements; and
   scintillator material provided at least party between the wire elements.

11. An X-ray detector, comprising:
   a plurality of layers of wire elements constructed to form a grid structure, wherein each layer is comprised of parallel wire elements, wherein the wire elements of adjacent layers run perpendicular to each other, resulting in openings within the grid between the perpendicular wires of adjacent layers;
   a plurality of scintillators, wherein one scintillator is located in each opening in the grid; and
   a sensor matrix positioned beneath the layers of wire elements and such that the plurality of layers of wire elements is between a radiation source and the sensor matrix, and performs a function of minimizing crosstalk between the scintillators which is known to result from scattered radiation.

12. The X-ray detector of claim 11, wherein the wire elements are made of a material that absorbs x-rays.

13. The X-ray detector of claim 11, wherein the distance between the wire elements with respect to one another in successive layers varies according to the distance from a radiation source.

14. The X-ray detector of claim 13, wherein the wire elements of a first of the plurality of layers of wire elements are spaced closer together than the wire elements of a second of the plurality of layers of wire elements, wherein the first layer is closer to the radiation source than the second layer, and wherein the layer closest to the radiation source has the smallest spacing of wire elements and the layer farthest from the radiation source has the largest spacing of wire elements.

15. The X-ray detector of claim 11, wherein the holes within a layer are differently sized.

16. The X-ray detector of claim 11, wherein the wire elements of a layer are embedded in a synthetic material that is transparent to X-rays in such a manner that each layer has plane surfaces.

17. The X-ray detector of claim 11, wherein the thickness of each layer does not exceed the diameter or cross-sectional dimensions of the wire elements.

* * * * *